UNITED STATES PATENT OFFICE 2,465,512

POLYSULFIDE SEALING PUTTIES AND COMPOUNDS

Frederic M. Carasso, Pasadena, Calif., assignor to Lockheed Aircraft Corporation, Burbank, Calif. No Drawing. Application October 22, 1945, Serial No. 623,868

15 Claims. (Cl. 260—29.2)

This invention relates to coating and sealing materials, and relates more particularly to such materials compounded from aqueous dispersions of polymeric organic polysulfides. This application is a continuation in part of my application, Serial No. 563,323, filed November 13, 1944, and now abandoned, and entitled "Sealing compounds."

The composition of matter provided by this invention has a wide application and is useful in practically any situation where adherent coatings or masses of rubber-like sealing materials are required. The invention finds one important application in vehicle fuel tanks subject to vibration and flexure. Tanks formed integral with the wings, fuselages, etc., of aircraft are examples of such containers or tanks. The sealing of the seams, rivets, and the like, of these tanks has presented a difficult problem. Various special sealing materials have been proposed, but for the most part, have proven unsatisfactory due to their inability to maintain full adhesion and adequate elasticity under the prevailing conditions of usage. The elasticity and adherence must be maintained in the presence of fuel, oil, water, etc., throughout a substantial range of temperatures, and the sealing material must be such that it does not develop pin holes, sag because of excessive softness, or crack by reason of becoming excessively hard.

Attempts have been made to employ aqueous dispersions of polymeric organic polysulfides as the basic ingredients for sealing materials of the class under consideration. The principal disadvantage to the practical utilization of such aqueous dispersions of polymeric organic polysulfides has been the difficulty in obtaining satisfactory and controlled coalescence in order to produce coherent and adherent coatings of good quality rubber.

It is an important object of this invention to economically and satisfactorily utilize aqueous dispersions of polymeric organic polysulfides to obtain coherent and adherent rubber-like coatings and masses upon the exposure of the material to conditions conducive to coalescence. The invention provides a simple, practical and effective means for producing coherent and adherent coatings, films and masses from the aqueous dispersions. The product of the invention has a high degree of adherence to metals of various kinds, wood, etc., remains flexible and resilient throughout a wide temperature range, and in the presence of fuels, oils, water and other fluids, and is therefore well suited for the sealing of tanks, containers and enclosures subject to vibration and flexure.

Another object of the invention is to provide a composition of matter obtained from the treatment of aqueous dispersions of polymeric organic polysulfides, and suitable for use as a coating, sealing and caulking material, which, when properly packaged, will remain water dispersible and unchanged for a prolonged storage period. The material may be immediately applied following preparation, or may be stored indefinitely for subsequent use.

Another object of the invention is to provide a method for treating or processing highly concentrated aqueous dispersions of polymeric organic polysulfides to obtain a firm putty-like material that may be stored indefinitely in a closed container without deleterious effects or that may be used immediately to form coherent and adherent masses or coatings for sealing purposes. The product may be diluted with water to any selected consistency either prior to packaging or subsequent to being removed from storage and, if desired, may be modified in character during or subsequent to its processing to have the desired physical attributes. The material of the invention may be marketed or distributed as a single-package product adapted for direct application to a variety of surfaces as a putty-like filleting, caulking and sealing material for the sealing of containers and tanks. When diluted to an appropriate viscosity, the material may be applied by extrusion, spatula, brushing, spraying, sloshing or other methods to yield coherent and adherent sealing coatings of practically any desired thickness. After coalescence the material is no longer dispersible, and is resistant to water and other fluids.

Another object of the invention is to provide highly effective coalescing agents for aqueous or non-aqueous dispersions of polymeric organic polysulfides from which coherent and adherent coatings and masses may be obtained. The class of coalescing or coagulating agents of the invention may also, if desired, be employed to produce coherent masses or sheets of rubber-like material without the necessity of employing acids, this function being distinct from the function of producing sealing "putty" and coatings.

A further object of the invention is to provide a means or method for producing, from aqueous dispersions, coalesced blends of polymeric organic polysulfides with other elastomers or synthetic resins.

A still further object of the invention is to provide a sealing or coating material of the character referred to that will not corrode alkali-sensitive materials such as aluminum, and that will not pit, peel or become discontinuous as a result of alkaline reaction with such materials. The commercially available polymeric organic polysulfides have a substantial alkaline reaction, the alkalinity being sufficient to cause appreciable reaction accompanied by the evolution of gas when in contact with aluminum and other alkali-sensitive materials. The reaction and accompanying gas generation may adversely affect the adhesion of the sealing material and result in a discontinuous sealing coating or mass. In accordance with the invention, one or more corrosion inhibitors compatible with the coalescing agent or agents may be incorporated in the material to avoid the reaction and its results.

The sealing and coating material of the invention is capable of wide variation, and the relative proportions of its components or ingredients may be modified materially to adapt it for specific uses. Accordingly, while I have hereinafter described several examples differing somewhat in proportions and composition, it is to be understood that the invention is not to be construed as limited to the details set forth.

The composition of matter provided by this invention may be said to comprise generally one or more polymeric organic polysulfides, one or more coalescing agents, and where required, a corrosion inhibitor.

The base or principal ingredient of the sealing and coating material is an aqueous dispersion of an organic polysulfide polymer resulting from the interaction of alkaline polysulfides and chlorinated organic compounds or a blend or mixture of two or more such polymers. United States Letters Patent No. 1,890,191 and No. 2,216,044 disclose synthetic latices of the general character herein referred to. A Thiokol latex is a polysulfide which is a polymer of the unit

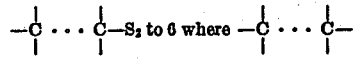

represents two carbon atoms joined to and separated by intervening structure. The coalescing agents of the invention have been found to be effective with each of the three Thiokol latices now commercially available and designated by their manufacturer as Thiokol MF, Thiokol WD2 and Thiokol MX. Blends or mixtures of two or more of such latices may be advantageously employed and the properties of the resultant product will depend upon the nature of the coalescing agent or agents used, and upon the influence of additional ingredients. While I have referred to three specific presently known synthetic latices, it is to be understood that the invention contemplates the utilization of other similar or equivalent polymeric organic polysulfides. Where the terms Thiokol, latex, or latices are herein employed, they are to be understood as meaning an aqueous dispersion of organic polysulfide polymers resulting from the interaction of alkaline polysulfides and chlorinated organic compounds. As will be later described, the proportion of the solids in the aqueous dispersion may vary greatly in different applications of the invention. Furthermore, the latex may be initially supplied for processing either in the form of a "cake" or in a relatively thin dispersion.

The coalescing agents are important ingredients of the invention. The coalescing agents are dithiocarbamate compounds derived from an amino nitrogen compound containing at least two hydrogen atoms directly attached to nitrogen. Several objects and advantages of the invention enumerated herein and other attendant advantages, result from the employment of one or more of these coalescing agents in processing the aqueous dispersions of polymeric organic polysulfides. The chemical structure of the coalescing agents provided by this invention corresponds essentially to the following general formula No. 1:

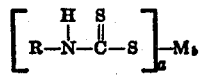

where "R" may be hydrogen or an organic radicle, "M" may be an organic amine radicle, ammonium, or a metallic radicle; and in certain cases, (if the respective dithiocarbamic acid may exist temporarily) "M" may represent hydrogen, and where "a" and "b" are simple whole numbers. In most instances, "a"= "b"= 1.

Best results are obtained from the addition product of two moles of a primary mono-amine for each mole of carbon disulfide. Here the product may be represented by formula No. 2:

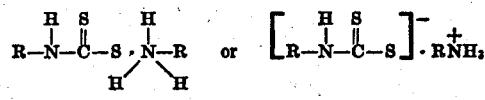

In formula No. 2, "M" is replaced by the same amine as employed in forming the dithiocarbamate radicle. Coalescing agents of this class may be readily and conveniently prepared by methods well known to those skilled in the art.

Metallic derivatives such as Na or Zn, of mono substituted dithiocarbamic acids may be employed as coalescing agents for the Synthetic latex dispersions, but have been found to be less effective than the corresponding amine or ammonium salts. Various types of amines are more or less effective as coalescing agents for alcoholic dispersions of polymeric organic polysulfides, as well as for aqueous dispersions of the polymeric organic polysulfides, but coatings and sealing masses embodying such preparations as coalescing agents are relatively non-adherent. Tough coherent sheets of polysulfide rubber may be produced by the action of certain amines, and secondary as well as primary amines may be used for this purpose. However, the performance of these amines alone is definitely inferior to the results obtainable by the use of dithiocarbamic salts derived from primary amines.

The use of dithiocarbamate salts in which "M," of formula No. 1, is an alkaline nitrogen-containing radicle comprising an amine different from that from which the dithiocarbamate radicle is derived, is contemplated by the invention. However, it has been found that entirely satisfactory results are obtainable by the use of dithiocarbamate salts in which "M," of formula No. 1, comprises the same amine as employed in forming the dithiocarbamate radicle. Blends or mixtures of two or more of the dithiocarbamates may be employed, but it has been found more desirable to use a single dithiocarbamate compound. The use of a free amine in addition to the dithiocarbamate compound, is also within the scope of the invention, but in most instances it is preferred to use the dithiocarbamate salt without an additional free amine.

The use of dithiocarbamate compounds derived from polyamines containing at least one primary amino group (or more generally alkaline nitrogen compounds which contain two or more nitrogen atoms, one of which has two hydrogen atoms directly attached thereto) is also contemplated by the invention, but I prefer to use the addition product of two moles of a primary mono amine for each mole of carbon disulfide.

The following examples illustrate compounds that may be used in preparing the dithiocarbamates, it being understood that the invention is not to be construed as limited to these particular examples:

Ammonia
Mono methylamine
Mono ethylamine
Mono-n-propylamine
Mono-iso-propylamine
Mono-n-butylamine
Mono-iso-butylamine
Mono-sec-butylamine
Mono-amylamine (commercial products, mixed isomers)
Mono-n-heptylamine
Mono-n-octylamine
Mono-2-ethyl-hexylamine
Mono-n-dodecylamine
Mono ethanolamine
Mono benzylamine
Ethylene diamine
Hexamethylene diamine
1,3-diamino-butane
1,3-diamino-propane
Mono allylamine
Mono methallyl amine
Mono cyclohexyl amine
Mono 2-methoxyethyl amine Dithiocarbamate salts prepared from aromatic amines may also be employed as coalescing agents. In such instances it is usual to employ amines which have ionization constants in the neighborhood of $10^{-5}$ or stronger, together with the aromatic amine to insure the formation of the dithiocarbamate salt. The following are typical examples of dithiocarbamate salts prepared from aromatic amines:

Ammonium phenyl dithiocarbamate
Ammonium p-tolyl dithiocarbamate
Ammonium alpha-naphthyl dithiocarbamate Dithiocarbamate salts derived from primary mono amines, other than aromatic amines, are particularly effective as coalescing agents for the aqueous Thiokol dispersions. These include dithiocarbamate salts derived from the following types of amines:

1. Simple or unsubstituted aliphatic amines: (a) Saturated, i. e., mono-n-butylamine; (b) Unsaturated, i. e., mono allylamine.
2. Substituted aliphatic amines, for example, those containing an ether linkage, i. e., 2-methoxyethylamine.
3. Alicyclic amines, i. e., cyclohexylamine.
4. Arylalkylamine in which the amino group is attached to an aliphatic substituent on an aromatic nucleus, i. e., benzylamine.

It is usually preferred to employ mono-n-butylammonium mono-n-butyl dithiocarbamate or mono allylammonium mono allyl dithiocarbamate as the coalescing agent for the polysulfide dispersion. These are the addition products derived from two moles of the respective amine per mole of carbon disulfide.

The coalescing agents of the invention are not restricted for use with any particular aqueous dispersion of polymeric organic polysulfides of any given composition, and the coalescing agents have been found to be effective with each of the three Thiokol latices now commercially available, namely, Thiokol MF, Thiokol WD2, and Thiokol MX. The coalescing agents described above may be used to advantage with any blend or mixture of two or more of such Thiokol latices, although the properties of the resultant product are dependent to a large degree upon the nature of the polysulfide latex dispersion from which it is derived and upon the quantity and character of the coalescing agent or agents.

In most embodiments of the invention, relatively small proportions of the coalescing agent are used, it being understood that the proportions of the coalescing agent may be varied within a rather wide range. Ordinarily, from approximately 0.2% to approximately 10% of the selected coalescing agent may be used, but I usually prefer to employ from approximately 0.25% to approximately 2% of the coalescing agent. The percentages here are in relation to the Thiokol solids of the compounds.

The coalescing agent may be incorporated with the latex dispersion in practically any selected manner. The following are typical ways of incorporating the coalescing agent in the dispersion:

(a) The coalescing agent may be incorporated with a concentrated aqueous polysulfide latex dispersion or "cake" obtained by allowing the latex to settle so that the supernatant liquid may be removed, or obtained by filtering the latex. This concentrated dispersion is relatively solid and is of firm consistency.
(b) The coalescing agent is incorporated in or added to a fluid aqueous latex dispersion.
(c) A suitable carrier, either aqueous or non-aqueous is utilized to introduce the coalescing agent into the latex dispersion. This facilitates the uniform distribution of the coalescing agent throughout the mixture.

The coalescing agent may be introduced into the synthetic latex dispersion at ordinary room temperatures, or at elevated temperatures as found most desirable, and may be employed with or without other materials to be added to the compound for given purposes. It has been found that proper incorporation of the coalescing agent into the latex dispersion is materially facilitated by conducting the mixing operation substantially in the absence of air at elevated temperatures ranging from 160° Fahrenheit to 212° Fahrenheit, and by using appropriate mixing technique.

Incorporation of the coalescing agent into a very concentrated aqueous latex dispersion has been found to be particularly advantageous. This yields a superior and highly versatile product and illustrates the remarkable effectiveness of the coalescing agents provided by the present invention. The material or polysulfide latex dispersion which, before treatment with the coalescing agent is a non-coherent, solid, dough-like mass or "cake", is readily converted by a small proportion of the coalescing agent into a smooth coherent putty-like material which remains water dispersible, and from which coherent and rubbery coatings or masses may be readily obtained. This feature of the invention provides a simplified and greatly improved method for processing or compounding a synthetic elastomer. The fact that a substantially solid latex cake may be treated in a vessel and at elevated temperatures with a relatively small proportion of a coalescing agent without becoming crumbly and difficult to handle, and to yield a smooth coherent water dispersible highly concentrated "putty" which is easy to process, was not known to others prior to this invention or contemplated by the prior art known to me. Heretofore, when a solid synthetic latex cake was similarly treated alone or with a prior coalescing agent, or other substance, it was impossible to obtain a smooth coherent useful "putty," and in most cases, the resultant product was dry, crumbly and incoherent.

The above described method of processing a solid cake of the synthetic latex has distinct advantages. The cake or raw material may be stored and shipped in a concentrated form, and the synthetic rubber may be processed or compounded in a highly concentrated water dispersible form to produce an extremely versatile product. Furthermore, the effectiveness of the coalescing agent is apparently increased when the agent is incorporated into the highly concentrated Thiokol cake.

Where the conditions of intended use require, an altered, "compounded" or modified product may be prepared by incorporating the coalescing agent of the invention in the latex dispersion in the presence of other ingredients, or during subsequent treatment of the dispersion. It is important, however, that such added ingredients or subsequent treatment of the dispersion should not adversely affect the function or purpose of either the coalescing agent or the latex. In other words, any alteration, modification or compounding should be limited to materials and procedures compatible with the coalescing agent and the polymeric organic polysulfide aqueous dispersion. The following are typical examples of materials which may be added to, or incorporated in, the sealing and coating material:

(a) Inert fillers such as asbestos fibre, viscose rayon fibre, cotton flock, etc.
(b) Reinforcing pigments and compounding ingredients such as zinc oxide, sulphur, zinc oxide and sulphur, walnut shell flour, zinc sulfide, titanium dioxide, etc.
(c) Materials which tend to mask or obviate objectionable odors.
(d) Liquids which have a swelling, softening, plasticizing or solvent effect, or which may serve as a carrier for the coalescing agent or other added materials. In this class are certain ketones, chlorinated compounds, etc.
(e) Synthetic resins, monomers and elastomers.
(f) Corrosion inhibitors for the purpose of controlling, suppressing or inhibiting reaction of an alkaline aqueous dispersion with a corrosion susceptible material such as aluminum.
(g) Other additives whose use advantageously affects certain properties of the product for a given use.

The polymeric organic polysulfide latices commercially available at the present time have a substantial alkaline reaction, and their alkalinity is sufficient to cause appreciable reaction with alkali-sensitive materials such as aluminum. The reaction is often accompanied by gas evolution. This may result in a discontinuous sealing coat or mass, and may adversely affect adhesion of the sealing material to the surface when the sealing material is applied to an alkali-sensitive surface under conditions which permit or favor such reaction. Where the sealing material is to be used on such surfaces and under such conditions, it may be desirable to include in the composition one or more substances for inhibiting, suppressing or controlling the reaction. Compounds suitable for use as corrosion inhibitors, in the composition of the invention, fall into two main classes:

1. Certain compounds comprising elements in groups III to VI, inclusive, of the periodic table, which elements are at the higher valences or states of oxidation. Examples of this class of inhibitors are: vanadium pentoxide, vanadium trioxide, ammonium sulfate, sodium metaphosphate, ammonium carbonate, chromium vanadate, magnesium vanadate, ammonium carbamate, ammonium bicarbonate, ammonium molybdate, boric acid and ammonium borate.

2. Certain organic acids or their derivatives. Examples of this class are: salicylic acid, diammonium sebacate, diammonium salt of itaconic acid and diammonium fumarate.

Excellent results are obtained by the use of vanadium pentoxide and/or compounds related to, derived from, or equivalent to vanadium pentoxide. I have found vanadium pentoxide, ammonium vanadate and ammonium metavanadate to be effective as corrosion inhibitors. Salicylic acid also has given good results. Other suitable inhibitors may be used, but it is important that they should not in any way interfere with the action of the coalescing agent or have harmful effects upon the latex. It is to be understood that the invention is not to be considered as restricted to the use of a corrosion inhibitor, or to the use of an aqueous Thiokol dispersion having an appreciable alkalinity.

EXAMPLES

The following examples of preferred sealing materials of the invention, and manners of making or compounding the same, are illustrative and are not to be taken as limiting the scope of the invention.

*Example 1*

100 parts aqueous fluid Thiokol MF (copolymer of polyethyleneformal polysulfide) dispersion (50% solids),
0.7 part coalescing agent—mono ethyl ammonium mono ethyl dithiocarbamate; (an addition product derived from two moles of mono ethyl amine for each mole of carbon disulfide).

The ingredients are thoroughly mixed together and then heated for about one hour at approximately 180° Fahrenheit, with frequent stirring or agitation. The resultant product is a grayish dispersion of low viscosity. Coatings of this material coalesce quite satisfactorily, and are initially soft, but ultimately become tougher. The product has good adhesion on various surfaces such as the surface of metals, wood, etc.

*Example 2*

100 parts Thiokol MF (copolymer of polyethyleneformal polysulfide) "cake"— (approximately 65% to 85% solids), obtained by removing the excess liquid from Thiokol latex.
15 parts water.
1 part coalescing agent—(addition product derived from two moles of mono benzylamine per mole of carbon disulfide).

The procedure for preparing the material may be the same as in Example 1. The resultant product has a higher viscosity than that of Example 1, and yields coatings that are appreciably tougher than those obtainable from the product of Example 1.

Example 3

100 parts Thiokol MF (copolymer of polyethyleneformal polysulfide) "cake"—(approximately 65% to 80% solids),
1 part coalescing agent, namely, mono-n-butyl-ammonium, mono-n-butyl dithiocarbamate—(addition product derived from two moles of mono-n-butylamine for each mole of carbon disulfide).

The procedure in preparing the material may be the same as in Example 1 with appropriate mixing. The resultant product is a solid having a putty-like consistency. The material has excellent package stability. Applied coatings of the material coalesce very satisfactorily, have effective adhesion to surfaces of various natures and are initially soft, but ultimately become quite firm. The material may be diluted with water to yield a fluid dispersion of any selected viscosity.

Example 4

100 parts Thiokol MF (copolymer of polyethyleneformal polysulfide) "cake" is dispersed with water and stirred thoroughly with five parts of short fibre asbestos. The excess liquid is then removed and the resultant asbestos-filled "cake" is treated as set forth in Example 3.

Example 5

100 parts Thiokol WD2 (polyethyleneformal polysulfide) "cake"—(approximately 65% to 80% solids),
1.1 part coalescing agent—mono-n-butylammonium, mono-n-butyl dithiocarbamate.

The procedure for preparing the material may be substantially the same as in the case of Example 1. The resultant product is appreciably more fluid than the product of Example 1. A substantial proportion of liquid separates and may be removed if desired, to leave a firmer and more compact "putty." The properties of the material of this example are similar to those of Example 3 with the following principal differences:
(a) The coatings are more translucent.
(b) There is superior coalescence in relatively thick coatings on irregular surfaces.
(c) There is superior maintained flexibility, resiliency and adherence throughout a greater range of temperatures.
(d) Inferior solvent resistance.

Example 6

66.7 parts Thiokol WD2 (polyethyleneformal polysulfide) "cake"—approximately 65% to 80% solids.
33.3 parts Thiokol MF (a copolymer of polyethyleneformal polysulfide and a polyolefin polysulfide) "cake"—approximately 65% to 80% solids.
1.1 part coalescing agent (mono-n-butylammonium mono-n-butyl dithiocarbamate).

Example 7

66.7 parts Thiokol WD2 (polyethyleneformal polysulfide "cake"—approximately 65% to 80% solids.
33.3 parts Thiokol MF (a copolymer of polyethyleneformal polysulfide and a polyolefin polysulfide) "cake"—approximately 65% to 80% solids.
1.1 part coalescing agent (mono-n-butylammonium mono-n-butyl dithiocarbamate.
0.05 to 0.25 part salicylic acid.

Example 8

66.7 parts Thiokol WD2 (polyethyleneformal polysulfide) "cake"—approximately 65% to 80% solids.
33.3 parts Thiokol MF (a copolymer of polyethyleneformal polysulfide and a polyolefin polysulfide) "cake"—approximately 65% to 80% solids.
0.9 part coalescing agent (mono-allylammonium mono-allyl dithiocarbamate).
0.1 to 0.5 part inhibtor—vanadium pentoxide or ammonium vanadate.

The procedure in preparing the material in Examples 6, 7 and 8 may be substantially the same as set forth in Example 3.

The advantages to be gained by practicing the present invention are numerous and will be apparent from the foregoing description. Aqueous Thiokol dispersions treated in accordance with the invention yield effective, coherent and adherent coatings and masses capable of maintaining full adhesion on a wide variety of materials and surfaces, and retain the desirable properties of solvent-resistance and low-temperature flexibility generally characteristic of organic polymeric polysulfides. The materials are capable of forming satisfactory sealing coatings on irregular surfaces and under widely varying conditions. The sealing materials may be handled, distributed and marketed as one-package products and have good package stability. When the material is prepared as a "putty," it has even a greater versatility. The putty-like material may be stored indefinitely in a closed container, has excellent package stability and is in a compact form for convenient shipping and storage. The "putty" may be supplied as a caulking and filleting material, and when so applied, yields sealing masses which coalesce thoroughly, uniformly and effectively under varying conditions. Where coatings are desired, the thick putty-like product may be diluted with water to the desired consistency for ready application as by spraying, brushing and "sloshing." The coatings obtained may be of substantial thickness where desired, and yet will coalesce thoroughly and uniformly throughout.

The sealing and coating materials of the invention are readily dispersible in water prior to their exposure to conditions favoring coalescence, but have a high resistance to water after coalescence. Coatings produced by the materials are compatible with other sealing materials, and the usual "top coatings" have good adhesion to the coalesced coatings. The attributes of effective resistance to a wide variety of solvents and liquids and the maintained adherence, flexibility and resiliency well suit the sealing materials of the invention for the sealing of containers and enclosures of various kinds.

It is to be understood that the invention is not to be taken as limited to the express procedure or examples set forth above, these details being given only by way of illustration. I do not regard such specific details as essential to the invention except insofar as they are expressed by way of limitation in the appended claims, in which it is my intention to claim the invention as broadly as permissable in view of the prior art.

I claim:
1. The method of treating an aqueous dis- persion of a polysulfide which is a polymer of the unit

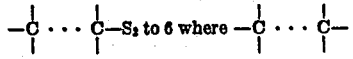

represents two carbon atoms joined to and separated by intervening structure, which method comprises adding to the dispersion a small amount of a mono-substituted member of the group consisting of alkyl, arylalkyl, alkeno and cyclo-alkyl monoamine salt of a member of the group consisting of alkyl, arylalkyl, alkeno and cyclo-alkyl substituted dithiocarbamic acids, and the ammonium salt of dithiocarbamic acid.

2. The method of treating an aqueous dispersion of a polysulfide which is a polymer of the unit

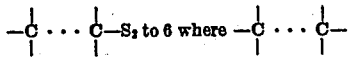

represents two carbon atoms joined to and separated by intervening structure, which method comprises adding to the dispersion from approximately 0.2% to approximately 10% by weight with respect to the solids content of the dispersion of a mono-substituted member of the group consisting of alkyl, arylalkyl, alkeno and cyclo-alkyl monoamine salt of a member of the group consisting of alkyl, arylalkyl, alkeno and cylo-alkyl substituted dithiocarbamic acids, and the ammonium salt of dithiocarbamic acid.

3. The method of treating an aqueous dispersion of a polysulfide which is a polymer of the unit

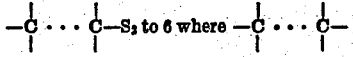

represents two carbon atoms joined to and separated by intervening structure, which method comprises adding to the dispersion a small amount of mono-normal-butylammonium mono-normal-butyl dithiocarbamate.

4. The method of treating an aqueous dispersion of a polysulfide which is a polymer of the unit

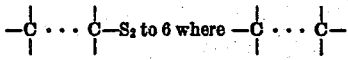

represents two carbon atoms joined to and separated by intervening structure, which method comprises adding to the dispersion a small amount of mono-allylammonium mono-allyl dithiocarbamate.

5. A sealing composition comprising an aqueous dispersion of a polysulfide which is the polymer of the unit

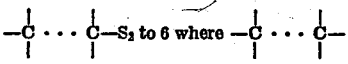

represents two carbon atoms joined to and separated by intervening structure, and a small amount of a mono substituted member of the group consisting of alkyl, arylalkyl, alkeno, and cyclo-alkyl monoamine salt of a member of the group consisting of alkyl, arylalkyl, alkeno and cyclo-alkyl substituted dithiocarbamic acids, and the ammonium salt of dithiocarbamic acid.

6. A sealing composition comprising an aqueous dispersion of a polysulfide which is the polymer of the unit

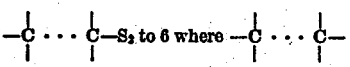

represents two carbon atoms joined to and separated by intervening structure, and from approximately 0.2% to approximately 10% by weight with respect to the solids content of said dispersion of a mono substituted member of the group consisting of alkyl, arylalkyl, alkeno, and cyclo-alkyl monoamine salt of a member of the group consisting of alkyl, aralkyl, alkeno and cyclo-alkyl substituted dithiocarbamic acids, and the ammonium salt of dithiocarbamic acid.

7. A sealing composition comprising an aqueous dispersion of a polysulfide which is the polymer of the unit

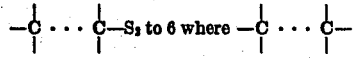

represents two carbon atoms joined to and separated by intervening structure, and a small amount of a coalescing agent comprising as its principal active ingredient mono-normal-butylammonium mono-normal butyl dithiocarbamate.

8. A sealing composition comprising an aqueous dispersion of a polysulfide which is the polymer of the unit

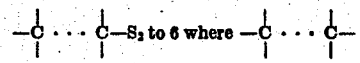

represents two carbon atoms joined to and separated by intervening structure, and a small amount of a coalescing agent comprising as its principal active ingredient mono-allylammonium mono-allyl dithiocarbamate.

9. A sealing composition comprising an aqueous dispersion of a polysulfide which is the polymer of the unit

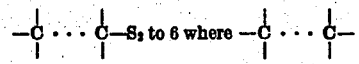

represents two carbon atoms joined to and separated by intervening structure, and from approximately 0.2% to approximately 10.0% by weight with respect to the solids content of said dispersion of a coalescing agent containing as its principal active ingredient mono-normal-butylammonium mono-normal butyl dithiocarbamate.

10. A sealing composition comprising an aqueous dispersion of a polysulfide which is the polymer of the unit

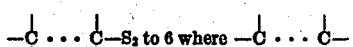

represents two carbon atoms joined to and separated by intervening structure, and from approximately 0.2% to approximately 10.0% by weight with respect to the solids content of said dispersion of a coalescing agent containing as its principal active ingredient mono-allylammonium mono-allyl dithiocarbamate.

11. A sealing composition comprising an aqueous dispersion of a polysulfide which is the polymer of the unit

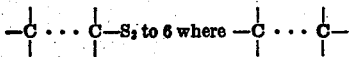

represents two carbon atoms joined to and separated by intervening structure, a small amount of a mono substituted member of the group consisting of alkyl, arylalkyl, alkeno, and cyclo-alkyl monoamine salt of a member of the group consisting of alkyl, arylalkyl, alkeno and cyclo-alkyl substituted dithiocarbamic acids, and the ammonium salt of dithiocarbamic acid, and a small amount of an oxygenated vanadium compound in which vanadium is in one of its higher states of oxidation to serve as an inhibitor for preventing alkaline attack of the sealing composition on alkali-sensitive materials.

12. A sealing composition comprising an aqueous dispersion of a polysulfide which is the polymer of the unit.

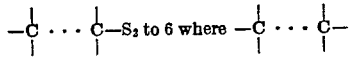

represents two carbon atoms joined to and separated by intervening structure, a small amount of a mono substituted member of the group consisting of alkyl, arylalkyl, alkeno, and cyclo-alkyl monoamine salt of a member of the group consisting of alkyl, arylalkyl, alkeno and cyclo-alkyl substituted dithiocarbamic acids, and the ammonium salt of dithiocarbamic acid, and a minor proportion of vanadium pentoxide serving as an inhibitor for preventing alkaline attack of the sealing composition on alkali-sensitive materials.

13. A sealing composition comprising an aqueous dispersion of a polysulfide which is the polymer of the unit

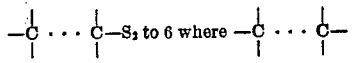

represents two carbon atoms joined to and separated by intervening structure, a small amount of a mono substituted member of the group consisting of alkyl, arylalkyl, alkeno, and cyclo-alkyl monoamine salt of a member of the group consisting of alkyl, arylalkyl, alkeno and cyclo-alkyl substituted dithiocarbamic acids, and the ammonium salt of dithiocarbamic acid, and a minor proportion of salicyclic acid to serve as an inhibitor for preventing alkaline attack of the sealing composition on alkali-sensitive materials.

14. A sealing composition comprising an aqueous dispersion of a polysulfide which is a polymer of the unit

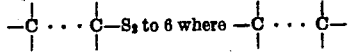

represents two carbon atoms joined to and separated by intervening structure, from approximately 0.2% to approximately 10% by weight with respect to the solids content of said dispersion of a coalescing agent comprising as its principal active ingredient a mono-substituted member of the group consisting of alkyl, arylalkyl, alkeno, and cyclo-alkyl monoamine salt of a member of the group consisting of alkyl, arylalkyl, alkeno and cyclo-alkyl substituted dithiocarbamic acids and the ammonium salt of dithiocarbamic acid, and a small amount of vanadium pentoxide serving as an inhibitor for preventing alkaline attack of the sealing composition on alkali-sensitive materials.

15. A sealing composition of heavy consistency adapted to be applied as supplied and adapted to be thinned with water comprising approximately 100 parts by weight of an aqueous dispersion of a polysulfide which is a polymer of the unit

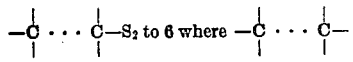

represents two carbon atoms joined to and separated by intervening structure, said dispersion containing from approximately 65% to approximately 80% solids; and from approximately 0.2% to approximately 10.0% by weight, with respect to the solids content of said dispersion, of a coalescing agent containing as its principal active ingredient a mono-substituted member of the group consisting of alkyl, arylalkyl, alkeno, and cyclo-alkyl monoamine salt of a member of the group consisting of alkyl, arylalkyl, alkeno and cyclo-alkyl substituted dithiocarbamic acids, and the ammonium salt of dithiocarbamic acid.

FREDERIC M. CARASSO.

REFERENCES CITED

The following references are of record in the file of this patent:

UNITED STATES PATENTS

| Number | Name | Date |
| --- | --- | --- |
| 2,140,063 | Talalay | Dec. 13, 1938 |
| 2,186,714 | Youker | Jan. 9, 1940 |
| 2,206,642 | Patrick | July 2, 1940 |
| 2,261,439 | Kelly | Nov. 4, 1941 |
| 2,379,464 | Thies | July 3, 1945 |

FOREIGN PATENTS

| Number | Country | Date |
| --- | --- | --- |
| 422,826 | Great Britain | Jan. 18, 1935 |
| 499,747 | Great Britain | Jan. 24, 1939 |